US006583883B2

(12) United States Patent
Egelhof

(10) Patent No.: US 6,583,883 B2
(45) Date of Patent: Jun. 24, 2003

(54) METHOD AND MEASURING DEVICE FOR MEASURING A ROTARY TOOL

(75) Inventor: Joachim Egelhof, Pluederhausen (DE)

(73) Assignee: Kelch GmbH + Co. Werkzeugmaschinenfabrik, Schorndorf (DE)

( * ) Notice: Subject to any disclaimer, the term of this patent is extended or adjusted under 35 U.S.C. 154(b) by 372 days.

(21) Appl. No.: 09/753,720

(22) Filed: Jan. 4, 2001

(65) Prior Publication Data
US 2001/0017699 A1 Aug. 30, 2001

(30) Foreign Application Priority Data
Jan. 8, 2000 (DE) .......................... 100 00 491

(51) Int. Cl.⁷ .......................... G01B 11/24; G01B 11/00
(52) U.S. Cl. .................... 356/601; 356/394; 382/152
(58) Field of Search .................. 356/601, 609, 356/613, 394; 382/152, 141, 255, 286; 348/135; 700/175, 176

(56) References Cited

U.S. PATENT DOCUMENTS 4,590,580 A  *  5/1986  Takezawa et al. ........... 700/176
4,700,224 A  * 10/1987  Miyasaka et al. ........... 382/152
5,255,199 A  * 10/1993  Barkman et al. ........... 700/175

FOREIGN PATENT DOCUMENTS

DE    3330280 A1  *  4/1984
DE    3743717 A1  *  7/1989
DE   41 20 746 A1    1/1993
DE   44 31 059 A1    3/1996
DE  196 26 140 A1    2/1998
EP    0 520 396 A1  * 12/1992
JP       5-215527    *  8/1993

OTHER PUBLICATIONS

Patent Abstracts of Japan, 5–215527 A, Dec. 3, 1993, vol. 17, No. 654.
Patent Abstracts of Japan, 58–35405 A, May 18, 1983, vol. 7, No. 113.

* cited by examiner

Primary Examiner—Alan A. Mathews
(74) Attorney, Agent, or Firm—Nath & Associates PLLC; Gary M. Nath

(57) ABSTRACT

In a method for measuring a rotary tool use is made of a measuring device, which has an optoelectronic image acquisition device with optics alignable with the rotary tool and an image processing device for the computer-aided evaluation of acquired images. For measurement purposes a section of the rotary tool is brought into the image area of the optics and the rotary tool is rotated about its rotation axis. During rotation a sequence of frames of the rotating rotary tool is acquired. An evaluation of the frames is carried out with respect to at least one image parameter, which represents a measure for the positioning of the tool contour relative to the sharpness zone of the optics. By computer-aided selection a selection is made of the particular frame in which the image parameter corresponds to a positioning of the tool contour in the sharpness zone of the optics. This selected frame is used for determining at least one tool parameter characterizing the tool contour. The method according to the invention permits a precise, high speed tool measurement and there is no need for a (manual) focussing of the tool cutting edge.

24 Claims, 1 Drawing Sheet

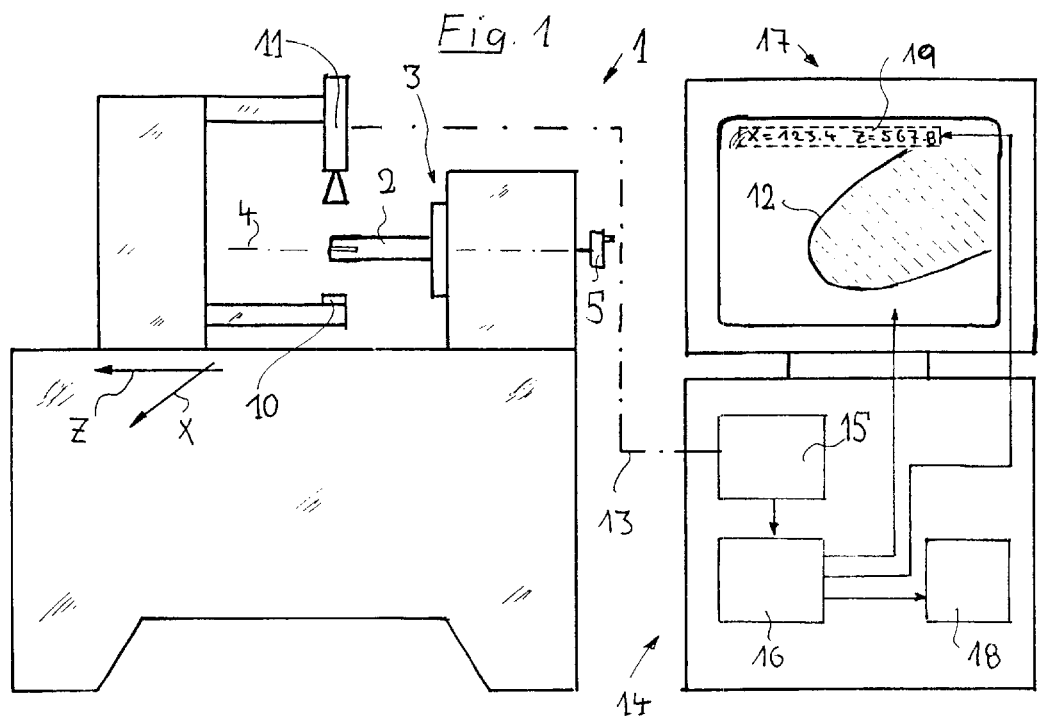
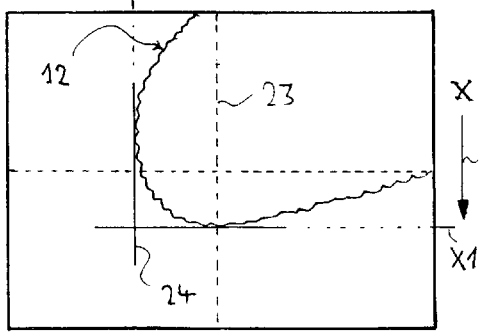
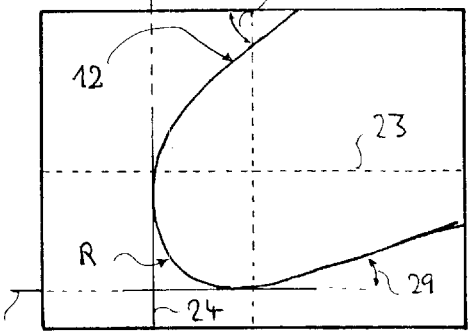
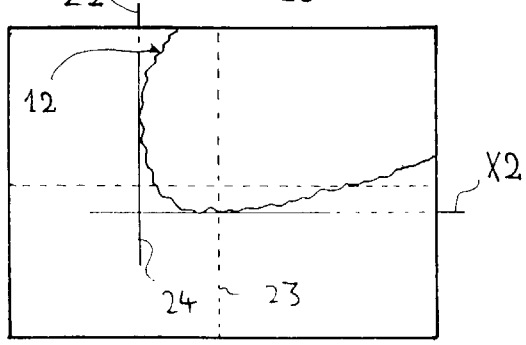

METHOD AND MEASURING DEVICE FOR MEASURING A ROTARY TOOL

BACKGROUND OF THE INVENTION

1. Field of the Invention

The invention relates to a method for measuring a rotary tool, rotatable about a rotation axis and mounted in a tool mounting having a tool contour determining the working dimensions of the rotary tool using a measuring device, which has an optical image acquisition device with an optics orientable onto the rotary tool for acquiring images of said rotary tool and an image processing device connected to the image acquisition device for the computer-aided evaluation of the acquired images, as well as a measuring device suitable for performing the method.

2. Description of the Prior Art

Rotary tools are e.g. used in working machines for the material-removing and in particular cutting working of workpieces. For example for the manufacture of precise holes or bores use is made of cutting devices in which the working or active dimensions of the tool are determined by a replaceable and adjustable tool cutting edge. In order to be able to respect the presently required, very close manufacturing tolerances and demands concerning the surface quality, bore shape, etc., such rotary tools must be measured in micrometer-precise manner and optionally precisely set for the particular application. Apart from the requirement of high precision measurement, with respect to optimized production sequences there is also a need for high speed of the tool measurement and setting.

In order in the case of manual tool setting to be able to fulfill the contradictory requirements of speed and precision, nowadays in place of the previously conventional tool measuring and setting devices with projectors, increasing use is being made of measuring devices, which comprise an optoelectronic image acquisition device and an image processing device connected thereto for computer-aided evaluation of acquired images. The image acquisition device normally has a CCD video camera, whose optics are aligned with the tool to be measured or on the area of the tool contour to be measured. The arrangement between the optics and the tool is to be so set during measurement that the rotation axis of the rotary tool is oriented perpendicular to the optical axis of the optics and passes through the area of the sharpness or definition zone of the optics. The camera is normally placed on a slide or carriage, which is movable in two directions perpendicular to the optical axis. Conventionally a direction running parallel to the tool mounting axis is called the Z-direction and a radial direction perpendicular thereto the X-direction. In the case of rotary tools, whose rotation axis in the case of a correct setting coincides with the tool mounting rotation axis, the Z-direction corresponds to the tool longitudinal direction, so that a Z-value corresponds to a tool length and a X-value to a tool radius.

A conventional, image processing-aided measuring sequence commences with an operator moving the tool contour to be measured (tool cutting edge) roughly into the image field of the optics with the aid of the X-Z-slide. The tool cutting edge then becomes visible in a monitor connected to the image acquisition device. In the following step the tool cutting edge to be measured is focussed in that the operator rotates the rotary tool about its rotation axis until the tool contour to be measured is located in the sharpness zone of the optics and is consequently focussed. The focussing step critical for the precision of the measurement is facilitated in certain known devices with image processing by a focussing display visible on the monitor. The focussing display is e.g. in the form of an analog bar display with colour change between red (still unsharp) and green (sharpness position) and guides the operator during focussing. Within the computer the deflection of the cutting edge contour in the radial direction (X-direction) is detected and evaluated for the focussing display. This is generally at a maximum when the tool cutting edge is in the sharpness zone. In practice the operator initially rotates the tool beyond the sharpness position and then slowly back for the actual measurement into the position of maximum sharpness corresponding to the maximum deflection in the X-direction. This focussing process is facilitated by the focussing display, which guides the operator during the focussing of the cutting edge and ensures an operator-independent focussing.

SUMMARY OF THE INVENTION

The object of the invention is to make available a tool measurement and setting aided by image processing and which permits a precise and at the same time very rapid tool measurement.

For solving this problem the invention proposes a method for measuring a rotary tool using a measuring device, the rotary tool being rotatable about a rotation axis and being mounted in a tool mounting with, the rotary tool comprising a tool contour determining the working dimensions of the rotary tool;

the measuring device comprising an optoelectronic image acquisition device including optics alignable with the rotary tool for acquiring images of the rotary tool, further comprising an image processing device connected to the image acquisition device for the computer-aided evaluation of acquired images, the method involving the following steps:

placing the area of the tool contour to be measured in an image area of the optics of the optoelectronics image acquisition device;

rotating the rotary tool about the rotation axis;

acquiring a sequence of frames of the rotating rotary tool;

computer-aided evaluation of the frames with respect to at least one image parameter, the image parameter representing a measure for the positioning of the tool contour with respect to a sharpness zone of the optics;

determining a selection frame by computer-aided selection of a frame from the sequence of frames, in which frame the image parameter corresponds to a positioning of the tool contour in the sharpness zone of the optics;

evaluation of the selection frame for determining at least one tool parameter characterizing the tool contour.

The object is also achieved by a measuring device for measuring a rotary tool, the rotary tool being rotatable about a rotation axis and being mounted in a tool mounting, the rotary tool comprising a tool contour determining the working dimensions of the rotary tool; the measuring device comprising:

an optoelectronic image acquisition device with optics alignable with the rotary tool for acquiring images of the rotary tool and;

an image processing device connected to the image acquisition device for the computer-aided evaluation of images acquired by the image acquistion device;

the image processing device comprising a frame grabber for acquiring a sequence of frames of the rotary tool and a computing unit with a working program for computeraided evaluation of the frames, wherein the working program comprises the following steps:

evaluation of the frames with respect to at least one image parameter, the image parameter representing a measure for the positioning of the tool contour with respect to the sharpness zone of the optics;

determination a selection frame by selecting a frame from the sequence of frames, in which frame the image parameter corresponds to a positioning of the tool contour in the sharpness zone of the optics;

evaluation the selection frame for determining at least one tool parameter characterizing the tool contour.

Preferred further developments are given in the dependent claims. The wording of all the claims is hereby made by reference into part of the description.

In the method according to the invention firstly a section of the rotary tool containing the tool contour to be measured is placed in the image field of the optics, which can be brought about by a suitable relative movement between optics and rotary tool. The rotary tool is rotated about its rotation axis and rotation normally only begins when the section to be measured is in the image field of the optics, but optionally also beforehand. During rotation there is an acquisition of a sequence of frames of the rotating rotary tool. These frames contain a view of the image field acquired by the optics and which corresponds to the particular acquisition time, i.e. a type of projection of the tool in a rotary position corresponding to the acquisition time. An acquisition of the rotary tool rotation position associated with a frame is unnecessary, but can take place. For frame acquisition it is possible for the image processing device to have a so-called frame grabber. There is a computer-aided evaluation of the frames and during evaluation an evaluation takes place of at least one image parameter characteristic of the tool contour and which represents a measure for the positioning of the tool contour with respect to the sharpness zone of the optics. This image parameter contains information as to whether the tool cutting edge during the acquisition of the frame was in or e.g. above or below the sharpness zone of the optics. By means of said image parameter it is possible to select from a plurality of frames a single frame which, compared with the other frames of the sequence, contains the sharpest imaging of the tool contour to be measured. This frame is referred to as the selection frame. As a function of the relationship between the rotation speed of the rotary tool and the time interval between directly following frames, there can also be several more or less equivalent frames with respect to the sharpness position and from which then at least one is selected. Thus, there is a determination of a selection frame by computer-aided selection of a frame from the sequence in which the image parameter corresponds to a positioning of the tool contour in the sharpness zone of the optics. Through the determination of the selection frame an image can so-to-speak be "frozen" and this can correspond to the image which would be seen by an operator in conventional equipment after a more or less complicated focussing. Finally there is an evaluation of the selection frame for determining at least one tool parameter characterizing the tool contour, e.g. the tool radius (X-value) in the range of interest and/or the tool length (Z-value).

The advantages of the invention are in particular that there is no need for a focussing of the tool cutting edge in the conventional sense. The invention makes use of the fact that with an image acquisition and processing of frames which is sufficiently fast compared with tool rotation, at least one of the frames has acquired the tool contour of interest (tool cutting edge) in the sharpest state and said frame carries all the information which is to be determined by image acquisition and evaluation in the measuring process. As there is no need for a focussing process, the invention permits a much faster measurement with a precision of measurement at least as good as in the prior art. There is also no need for focussing display devices, i.e. for guiding the operator during focussing. The at least one determined tool parameter can be outputted and e.g. displayed on a data display means such as a monitor and/or can be stored for further processing in a storage means of the image processing device. Determinable tool parameters, apart from the indicated X and Z-quantities, include e.g. values for the cutting edge radii and angles, as well as programming quantities, such as the theoretical radius or theoretical length. In a preferred method said evaluation and optionally data output take place during tool rotation, so that a real time measurement is possible.

The situation can in particular be such that the rotation of the rotary tool takes place continuously, preferably without stopping or deceleration at the sharpness position and/or without rotating back the tool mounting in such a way that the tool cutting edge after passing through the sharpness plane is returned thereto for measurement. Thus, there is no need for the possibly repeated approach and removal with respect to the so-called radial reversal point of the tool cutting edge encountered in conventional measurements.

In a preferred embodiment the acquisition of directly succeeding frames in the sequence takes place with a time interval of less than 0.1 second and the time interval is in particular between approximately 0.01 and approximately 0.5 seconds and is preferably approximately 0.02 seconds. This virtually permits a real time measurement and it is ensured that with standard tool rotation speeds during the measurement at least one of the frames reproduces in sharply imaged form the tool contour within the resolution of the optics. It would be possible to provide separate devices for ensuring this. For example a warning indication or display can be provided, which optically and/or acoustically warns the operator as a function of the actual tool rotation speed when a maximum permitted speed limit for a precise measurement is exceeded. Alternatively or additionally it is possible to provide a limiting device, which limits the speed of the rotary tool during the measurement to a corresponding maximum speed.

A high frame frequency of e.g. 50 Hz also makes it possible to evaluate the selection frame and/or an optionally provided outputting of data in time-near manner for a preferably uninterrupted passage of the tool contour to be measured through the sharpness zone. For a micrometeraccurate measurement of interesting tool parameters, it is merely necessary to rotate the tool beyond the sharpness point. The determined values are frozen and can be immediately displayed.

The rotary movement can be repeated a random number of times by an operator or an automatic mechanism either by rotating backwards and forwards or by a multiple rotation of the tool in one direction, in order to acquire confidence in the measurement and/or determine independent measurement statistics. In the method according to the invention the desired measured values or data are redetermined during each passage of the tool contour through the sharpness zone and preferably independently of the rotation direction.

In a preferred method the image parameter by means of which there is a selection of the selection frame to be further processed, use is made of a radial spacing value X of the tool contour with respect to the rotation axis of the rotary tool. Thus, the basis for the frame selection is a simple length or spacing determination, which can be particularly rapidly performed by computer. Additionally or alternatively it is possible to use the contrast in the area of the tool contour to be measured or corresponding operands as a basis for frame selection.

According to a further development, for determining the selection frame there is a comparison of image parameters from frames acquired in different rotary positions of the rotary tool leading to an extreme value determination. The situation can e.g. be such that successive frames are successively stored in an image memory, which preferably is in the form of a buffer memory operating according to the first-in-first-out principle with several adequately dimensioned storage locations for receiving the image data of a frame. This permits a rapid image processing, in which a completely read in frame is already evaluated during the reading in in time-parallel manner of the following frame. During evaluation a contour tracking of the acquired tool contour can take place, in order to determine for the tool contour at least the extreme value of the selected reference image parameter, particularly the maximum radial deflection X and optionally also further parameters, e.g. the associated maximum length value Z. By means of a comparison routine the frame having the sought extreme image parameter value can be determined and used as a basis for further calculations. This method variant with a FIFO buffer store requires a particularly small storage location.

As stated, a measuring device suitable for performing the method has an optoelectronic image acquisition device and an image processing device connected thereto. The latter has a frame grabber for the acquisition of a sequence of frames of the rotating rotary tool and a computing unit in which is processed or operates a working program for computer-aided evaluation of the frames. The working program is constructed for performing the following steps:

evaluation of the frames with respect to at least one image parameter characteristic of the tool contour and which represents a measure for the positioning of the tool contour relative to the sharpness zone of the optics;

determination of a selection frame by selecting at least one frame in the sequence in which the image parameter corresponds to a positioning of the tool contour in the sharpness zone of the optics;

evaluation of the selected selection frame for determining at least one tool parameter characteristic of the tool contour.

Preferably, with the measuring device is associated an image display means connected to the image acquisition device and/or to the image processing device for the optical display of images acquired by the optics. The image display means preferably comprises at least one monitor. Appropriately there is also an output device for the preferably optical outputting of the tool parameters determined, which e.g. outputs to a memory and/or can be directly displayed in a data display area of the monitor.

A measuring device according to the invention can be operated in conjunction with a suitable means, which has a suitable, preferably rotary tool mounting, which is appropriately movable in at least the two axes described perpendicular to the optical axis of the optics. Thus, the measuring device can be used in conjunction with most presently available tool setting and measuring means, particularly also those relatively simply constructed means in which the rotation of the spindle having the tool mounting takes place manually.

The measuring method and the corresponding measuring device can also be used for other, corresponding measurements. A measuring device could also be directly used on a machine tool for setting or checking tools with respect to dimensions and/or concentricity, as well as for the correct positioning of the tool in a machine spindle. The invention can also be used with tools having a plurality of cutting edges and then for some or all the tool cutting edges a measurement can be performed in the above-described manner. It is also possible to measure rotary tools constructed in the manner of angle scanning heads. In the case of the latter at least one rotary tool is placed in rotary manner on a support member insertable in a tool mounting and the rotation axis of the rotary tools drivable by means of a separate drive is at an angle to the rotation axis of the tool mounting or support member.

These and further features can be gathered from the claims, description and drawings and the individual features, both singly and in the form of subcombinations, can be implemented in an embodiment of the invention and in other fields and can represent advantageous, independently protectable constructions.

BRIEF DESCRIPTION OF THE DRAWINGS

An embodiment of the invention is described hereinafter relative to the attached drawings, wherein show:

FIG. 1 A diagrammatic representation of a tool presetting device, which is equipped with an embodiment of a measuring device according to the invention.

FIG. 2 A diagrammatic representation of an image field detail acquired by the optics of the measuring device with an unsharp-appearing contour of a tool cutting edge of a rotating rotary tool shortly before passing through the sharpness zone of the optics.

FIG. 3 The tool cutting edge of FIG. 2, now located in the sharpness zone of the optics.

FIG. 4 The tool cutting edge of FIG. 2 shortly after passing through the sharpness zone.

DETAILED DESCRIPTION OF A PREFERRED EMBODIMENT

FIG. 1 diagrammatically shows a presetting device 1 for machine tools 2. The rotary tool 2 constructed as a cutting device is received and clamped in a tool mounting 3, which has a mounting or locating hole or bore corresponding to the mounting hole or bore of the machine tool spindle and which is e.g. shaped in matching manner to a steep taper on the tool 2. The tool is mounted in rotary manner about a horizontal axis 4 in the tool mounting and represents the common rotation axis of the tool mounting and tool and which in the case of an ideally clamped tool 2 coincides with the tool-fixed rotation axis. In the simple embodiment of the presetting device shown here, the tool mounting 3 can be rotated backwards and forwards by means of a handwheel 5.

With the presetting device 1 is associated an embodiment of a measuring device according to the invention comprising a cold light source 10, which is generally directed upwards and positioned below the axis 4 and which illuminates the tool 2 from below in such a way that in the optics of a video camera 11 positioned facing the light source 10 diametrically with respect to the axis 4 appears an image of the outer tool contour 12 (monitor in FIGS. 1, as well as 2 to 4). The video camera 11, which is preferably equipped with telecentric optics, is an essential part of the electrooptical image acquisition device of the measuring device and preferably contains at least one CCD chip or a CMOS chip for converting the optical image incident in the optics into electronic signals, which are supplied by means of a suitable, diagrammatically represented signal line 13 to a diagrammatically represented image processing device 14. In place of the analog camera shown, it is also possible to use a digitally operating camera, which supplies the signal line 13 with digital signals. The camera operating with an image frequency of 50 Hz, supplies 50 frames or corresponding data or signals every second. With respect to the rotation axis 4 the camera 11 is positioned in such away that in the correct setting the rotation axis 4 is in the sharpness zone of the optics. The optical devices 10 and 11 are movable by means of a not shown X-Z-coordinate slide in a horizontal plane in the X-direction (perpendicular to axis 4) and in the Z-direction (parallel to axis 4).

The image processing device 14 equipped with a computer, e.g. a persona computer, processes the image signals acquired by the camera 11 and converted into electronic signals and optionally preprocessed. The images are in digitized form, are digitally processed and images and/or evaluated data can be stored and/or can be delivered to external output devices, such as printers, optical and/or acoustic indicating or display means, etc.

An essential element of the image processing device is a frame grabber 15 connected to the camera 11 and which is able to acquire a sequence of frames of the rotating rotary tool. Such a frame grabber is in a position to acquire signals or data corresponding to a frame in short time intervals of e.g. approximately 0.02 seconds and to supply the data quantities corresponding to the frames in time-near manner for acquisition, quasi in real time, to an image memory, image display means and/or a processing device for the data and/or other devices utilizing image data.

In FIG. 1 the frame grabber 15 is connected to a computing unit 16 of the image processing device in which a digital image processing can be carried out by means of suitable working programs. To the computing unit is connected a monitor 17, which serves as an image display means for the optical display of a digitally processed image acquired by the camera optics or alternatively a detail of said image. On the monitor screen there is also a data display area 19, in which can be displayed during tool measurement tool parameters determined with the aid of the computing unit 16. To the computing unit is also connected at least one further device 18 for the further processing of image data, e.g. a printer, memory, etc.

A measuring process can take place in the following way. Firstly an operator moves the tool cutting edge to be measured and whose contour determines the working dimensions of the rotary tool, with the aid of a X-Z-coordinate slide of the camera support, not shown in FIG. 1, roughly into the area visible on the screen of monitor 17. In the latter a vertical direction 25 in FIG. 2 represents the X-direction or X-axis, whose coordinate origin is on the axis 4 and which extends perpendicular to the optical axis of the camera 11 and perpendicular to the axis 4. Thus, a corresponding X-value is a measure for the radius (rotation axis spacing) of the tool at an observed longitudinal positioning Z. The horizontally directed Z-direction 26 in FIG. 2 runs parallel to the tool rotation axis 4. Thus, a corresponding Z-value in the present example represents a measure for the length of the tool for a given X-value, relative to a coordinate origin located on the axis 4. The path of the tool contour 12 can be given by a plurality of value pairs in said X-Z-coordinate system. Within the framework of the measurement precision the true values are only obtained in the sharp position of the tool cutting edge shown in FIG. 3 and which is located in the sharpness zone of the optics, so that the tool contour 12 is sharply imaged.

The X-value serves as a characteristic image parameter with the aid of which it is possible to establish the positioning of the tool cutting edge with respect to the sharpness zone of the optics. Thus, the value of the maximum deflection of the tool contour 12 in the X-direction has its maximum value in the case of a correct setting of the measuring device (sharpness zone of the optics in the vicinity of axis 4) precisely when the tool cutting edge is located in the sharpness zone, because in this case the radius vector of the tool leading to the tool cutting edge is perpendicular to the optical axis of the measuring device. For all positions not in the sharpness zone only a shorter projection of this vector corresponding to the rotation angle with respect to the sharp position is observed.

To illustrate the position of the cutting edge contour 12 in the represented image area, a broken line screen-fixed crossline 23 passing through the image area centre is shown, which can be obviated in the case of real devices, as well as a measurement cross 24 engaging with the tool contour and whose contact points with the latter in each case give the maximum values for the X-value and the Z-value in the corresponding image.

If an operator roughly moves the tool into the measurement window, generally the cutting edge is initially imaged in unsharp manner, e.g. as shown in FIG. 2. For initiating the measurement the operator, e.g. by means of a specific key on a keyboard associated with the image processing device 14, can start a measuring loop. The start of the measurement can also be initiated in other ways, e.g. by a speech entry or an automatic device starting the measuring loop as soon as the tool contour projects into the image area in a suitable manner for the measurement. For micrometer-precise measurement of the tool cutting edge, as a result of the invention, it is merely necessary to carry out a rotary movement of the tool over and beyond the maximum X-deflection rotary position. This rotation can be performed manually with the aid of the handwheel 5. During the rotation and using the image acquisition device frames are recorded at short time intervals of e.g. approximately 0.02 seconds and the image content thereof can correspond to the images in FIGS. 2 to 4.

For example the frame of FIG. 2 recorded shortly prior to passage through the sharpness zone shows a slightly blurred tool contour 12 with a X-value X1 and a Z-value Z1. Image processing allocates this image to the associated maximum X-value X1, which is smaller than the maximum deflection value Xmax detectable in the sharpness position (FIG. 3). On rotating the tool the maximum X-value of successive frames slowly approaches the maximum value Xmax (FIG. 3), reaches said maximum value in the sharpness position and then on rotating beyond the sharpness position decreases again e.g. in the position shown in FIG. 4 with a smaller X-value X2 and corresponding Z-value Z2.

The images acquired by the camera 11 with an image repeat frequency of 50 Hz are further processed in time-near manner and virtually in real time from the standpoint of the operator. The frames are acquired or grabbed with the indicated frequency by the frame grabber 15 and read sequentially into an image memory of the computing unit 16. The image memory is preferably a FIFO buffer memory with a plurality of successively occupiable storage locations, which by a corresponding storage size allocation are in each case dimensioned in such a way that the data quantity corresponding to a frame can be stored. The acquired images are successively "pushed" into the buffer memory by the frame grabber 15 and at the other end of the memory line the frames "drop out" in the same order in which they were read in.

The frames are evaluated during their period spent in the buffer memory. Rapid image processing is assisted by the fact that a previously read in frame can be evaluated during the reading in of the following frame. The frames are initially evaluated with respect to the selected image parameter, i.e. the maximum radial deflection value X in the example. Optionally at least the associated Z-value can be immediately determined. In practice the situation can be such that by contour tracking of the entire drawn in tool contour, many X-Z-values pairs with a suitable spatial spacing describing said tool contour are determined and filed in a memory for further calculations. By means of the maximum value of the radial deflection X in each of the images, it is possible to establish by a comparison process with extreme value determination whether a following frame has a larger, substantially identical or smaller maximum X-value. If a larger maximum X-value is found, then the evaluation can be continued and terminated with the image having the largest maximum X-value. Thus, during the rotation of the rotary tool, the particular frame is determined which corresponds to the maximum deflection in the X-direction, which in the case of a correct setting of the optics with respect to the axis 4 corresponds to the focussing of the tool cutting edge. Typical times between the moment of the drawing in of the image and the representation of the image, as well as the associated measured values on the monitor, can be in the range of less than 1/10 second, e.g. approximately 0.08 second.

Said selected selection frame 27 (FIG. 3) forms the basis for the determination of all tool parameters of interest to the operator. Alternatively or additionally to the indicated parameters for the tool length (Z-value) and tool radius (X-value), these can also be values of the cutting edge curvature radius (R-value), the main cutting edge angle 28, the secondary cutting edge angle 29 and programming quantities, such as e.g. theoretical radii or lengths. The interesting measured values or data can be displayed at the same time as the passage of the tool cutting edge through the sharpness plane in the measurement zone output area 19.

In the present example the maximum value of the deflection in the X-direction is used as the sharpness-indicating image parameter, the X-values in FIGS. 2 to 4 increasing downwards and the Z-values to the left. In general, an extreme value determination can take place, e.g. evaluated after a minimum value of the deflection in the X-direction. This is appropriate if said value is suitable for indicating the sharpness setting for a corresponding tool orientation. This would e.g. be the case if the tool cutting edge, unlike what is shown in FIGS. 1 to 4, projects from bottom left and not from top right into the image area. To take account of all possible cases of tool orientations, which can in particular occur with angle scanning head tools, in a preferred variant of the evaluation process initially the extreme values in all four surface directions (+X, −X, +Z, −Z) are determined for an object extending into the image area and from the same is or are selected the value or values suitable and intended for the determination of the sharpness position or setting.

A major advantage of the method according to the invention is that on rotating the tool in the described method, the image corresponding to the sharp setting can be frozen without any action on the part of the operator and evaluated for the further determination of tool parameters. The operator does not have to carry out any focussing. Correspondingly in a measuring device functioning according to the invention there is no need for focussing displays, such as are conventionally frequently provided to assist the operator. The operator can repeat the rotary movement a random number of times and in random directions, e.g. to acquire confidence in the measurement and/or make his own statistics in connection with the determination of the precision of measurement. The values corresponding to the sharp state are redetermined during each passage through the sharpness zone. A data output to another device, e.g. a data memory, printer, etc., can be initiated by the operator, e.g. by depressing the input key on the keyboard. This measured value can e.g. be stored in a data bank and can be associated with an identification number identifying the tool 2.

What is claimed is:

1. Method for measuring a rotary tool using a measuring device, the rotary tool being rotatable about a rotation axis and being mounted in a tool mounting with the rotary tool comprising a tool contour determining the working dimensions of the rotary tool;

the measuring device comprising an optoelectronic image acquisition device including optics alignable with the rotary tool for acquiring images of the rotary tool, further comprising an image processing device connected to the image acquisition device for the computer-aided evaluation of acquired images, the method involving the following steps:

placing the area of the tool contour to be measured in an image area of the optics of the optoelectronics image acquisition device;

rotating the rotary tool about the rotation axis;

acquiring a sequence of frames of the rotating rotary tool;

computer-aided evaluation of the frames with respect to at least one image parameter, the image parameter representing a measure for the positioning of the tool contour with respect to a sharpness zone of the optics;

determining a selection frame by computer-aided selection of a frame from the sequence of frames, in which frame the image parameter corresponds to a positioning of the tool contour in the sharpness zone of the optics;

evaluation of the selection frame for determining at least one tool parameter characterizing the tool contour.

2. Method according to claim 1, wherein the selection frame is evaluated during the rotation of the rotary tool.

3. Method according to claim 1, comprising the step of outputting the determined, at least one tool parameter.

4. Method according to claim 3, wherein the step of outputting comprises an optical outputting of the tool parameter during the rotation of the rotary tool.

5. Method according to claim 1, wherein the rotary tool is continuosly rotated during the measurment.

6. Method according to claim 1, wherein the rotary tool is rotated during the measurment without at least one of stopping the rotation in a sharpness position of the tool contour and rotating back the rotary tool into a sharpness position of the tool contour.

7. Method according to claim 1, wherein the rotary tool is rotated manually.

8. Method according to claim 1, wherein the acquisition of directly succeeding frames in the sequence of frames takes place with a time interval of less than 0.1 second between succeeding frames.

9. Method according to claim 1, wherein at least one of the evaluation of the selection frame and the outputting of at least one tool parameter evaluated from a selection frame takes place in time-near manner to an uninterrupted passage of the tool contour through the sharpness zone of the optics.

10. Method according to claim 1, wherein an extreme value of a radial spacing value X of the tool contour with respect to the rotation axis of the rotary tool is selected as the image parameter for determining the selection frame.

11. Method according to claim 10, wherein the extreme value of the radial spacing X is a maximum value of the radial spacing value X.

12. Method according to claim 1, wherein the step of determining of the selection frame includes a comparison performed of image parameters from frames acquired at different rotary positions of the rotary tool with the result of an extreme value determination for this image parameter.

13. Method according to claim 1, further including the step of determining at least two tool parameters from the selection frame.

14. Method according to claim 13, wherein the at least two tool parameters include the tool parameter corresponding to the image parameter used for determining the selection frame.

15. Method according to claim 14, wherein the additional tool parameter includes at least one of a tool length, at least one cutting edge radius, at least one cutting edge angle, a theoretical radius and a theoretical length.

16. Measuring device for measuring a rotary tool, the rotary tool being rotatable about a rotation axis and being mounted in a tool mounting, the rotary tool comprising a tool contour determining the working dimensions of the rotary tool; the measuring device comprising:
   an optoelectronic image acquisition device with optics alignable with the rotary tool for acquiring images of the rotary tool and;
   an image processing device connected to the image acquisition device for the computer-aided evaluation of images acquired by the image acquistion device;
   the image processing device comprising a frame grabber for acquiring a sequence of frames of the rotary tool and a computing unit with a working program for computeraided evaluation of the frames, wherein the working program comprises the following steps:
   evaluation of the frames with respect to at least one image parameter, the image parameter representing a measure for the positioning of the tool contour with respect to the sharpness zone of the optics;
   determination a selection frame by selecting a frame from the sequence of frames, in which frame the image parameter corresponds to a positioning of the tool contour in the sharpness zone of the optics;
   evaluation the selection frame for determining at least one tool parameter characterizing the tool contour.

17. Measuring device according to claim 16, wherein there is provided an image display means for optically displaying images acquired by the optics, wherein the immage display means is connected to at least one of the frame grabber and the image processing device.

18. Measuring device according to claim 17, wherein the image display includes a monitor.

19. Measuring device according to claim 16, further comprising an output device connected to the image processing device, the output device beeing adapted for outputting the tool parameter.

20. Measuring device according to claim 19, wherein the output device includes an optical data display means.

21. Measuring device according to claim 18, wherein the monitor includes a optical outputting device for outputting the tool parameters, the output device beeing constructed in an area of a screen of the monitor.

22. Measuring device according to claim 16, wherein the measuring device is associated with a tool measuring and setting means comprising a rotatable tool mounting.

23. Measuring device according to claim 22, wherein the tool mounting is manually rotatable.

24. Tool measuring and setting means comprising a rotatable tool mounting, further being associated with a measuring device according to claim 16.

* * * * *